United States Patent
Kurmus et al.

(10) Patent No.: US 10,761,970 B2
(45) Date of Patent: Sep. 1, 2020

(54) COMPUTERIZED METHOD AND SYSTEMS FOR PERFORMING DEFERRED SAFETY CHECK OPERATIONS

(71) Applicant: International Business Machines Corporation, Armonk, NY (US)

(72) Inventors: Anil Kurmus, Zurich (CH); Matthias Neugschwandtner, Zurich (CH); Alessandro Sorniotti, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 15/789,247

(22) Filed: Oct. 20, 2017

(65) Prior Publication Data

US 2019/0121716 A1   Apr. 25, 2019

(51) Int. Cl.
  *G06F 11/00* (2006.01)
  *G06F 11/36* (2006.01)
  (Continued)

(52) U.S. Cl.
  CPC ............ *G06F 11/366* (2013.01); *G06F 21/00* (2013.01); *G06F 9/30076* (2013.01); *G06F 9/3855* (2013.01)

(58) Field of Classification Search
  CPC .................................................. G06F 11/366
  See application file for complete search history.

(56) References Cited

U.S. PATENT DOCUMENTS 5,696,955 A * 12/1997 Goddard ................. G06F 7/785
    712/222
5,944,816 A *  8/1999 Dutton .................. G06F 9/3851
    710/266

(Continued)

FOREIGN PATENT DOCUMENTS

WO   WO 2007/092524 A2   8/2007

OTHER PUBLICATIONS

Erlingsson, "The Inlined Reference Monitor Approach to Security Policy Enforcement", Dissertation, Cornell University, Jan. 2004, 184 pages.

(Continued)

*Primary Examiner* — Katherine Lin
(74) *Attorney, Agent, or Firm* — Scully, Scott, Murphy & Presser, P.C.; Daniel Morris, Esq.

(57) ABSTRACT

The invention is notably directed to a computer-implemented method for performing safety check operations. The method comprises steps that are implemented while executing a computer program, which is instrumented with safety check operations. As a result, this computer program forms a sequence of ordered instructions. Such instructions comprise safety check operation instructions, in addition to generic execution instructions and system inputs. System inputs allow the executing program to interact with an operating system, which manages resources for the computer program to execute. A series of instructions are identified while executing the computer program. Namely, a first instruction is identified in the sequence, as one of the safety check operation instructions, in view of its subsequent execution. After having identified the first instruction, a second instruction is identified in the sequence. The second instruction is identified as one of the generic computer program instructions. Execution of the second instruction identified is started, irrespective of a completion status of the first instruction. Next, and after having identified the second instruction, a third instruction is identified in the sequence. The third instruction is identified as one as one of the system inputs. There, completion of execution of the first instruction (the safety check operation instruction) is required prior to completing execution of the third instruction (the system input). The invention is further directed to related computerized systems and computer program products.

13 Claims, 4 Drawing Sheets

(51) Int. Cl.
*G06F 21/00* (2013.01)
*G06F 9/38* (2018.01)
*G06F 9/30* (2018.01)

(56) References Cited

U.S. PATENT DOCUMENTS

| | | | |
|---|---|---|---|
| 8,090,934 B2* | 1/2012 | Koc | G06F 9/3806 |
| | | | 712/238 |
| 8,104,021 B2 | 1/2012 | Erlingsson et al. | |
| 2006/0149933 A1* | 7/2006 | Eickemeyer | G06F 9/3842 |
| | | | 712/219 |
| 2012/0131309 A1* | 5/2012 | Johnson | G06F 9/30 |
| | | | 712/41 |
| 2015/0347134 A1* | 12/2015 | Gschwind | G06F 9/30058 |
| | | | 712/239 |
| 2016/0026791 A1 | 1/2016 | Melski et al. | |

OTHER PUBLICATIONS

Szekeres et al., "SoK: Eternal War in Memory", 2013 IEEE Symposium on Security and Privacy, May 19-22, 2013, pp. 48-62.
Locasto et al., "Speculative Execution as an Operating System Service", Tech Report CUCS-024-06, Department of Computer Science, Columbia University, May 2006, pp. 1-6.
Erlingsson et al., "IRM Enforcement of Java Stack Inspection", 2000 IEEE Symposium on Security and Privacy; May 14-17, 2000; Berkeley, California, 10 pages.
Theobald et al., "Speculative Execution and Branch Prediction on Parallel Machines", In the Proceedings of the 7th ACM International Conference on Supercomputing, Tokyo, Japan, Jul. 20-22, 1993, pp. 77-86.

* cited by examiner

COMPUTERIZED METHOD AND SYSTEMS FOR PERFORMING DEFERRED SAFETY CHECK OPERATIONS

BACKGROUND

The invention relates in general to the field of computerized method, systems and program products for performing safety check operations. In particular, embodiments of the invention allow for deferred safety check operations.

More and more elaborated approaches are being developed to defend against memory corruption vulnerabilities, starting with solutions providing some form of memory safety. The latter are implemented using inline reference monitors (IRMs), that is, they instrument a target program with inline checks, which ensure that required safety properties are satisfied at runtime. Unfortunately, such checks often incur a high overhead. Furthermore, it is extremely difficult to reduce this overhead through implementation optimizations alone.

IRMs have initially been used for interpreted languages such as Java, and dot NET (".NET") before spreading to intermediate languages and mobile applications. To advance the implementation of inline reference monitors, Prolog and aspect-oriented programming have been proposed.

In addition to the standard approaches of storing pointer-related metadata, fat pointers and separate metadata tables, recent research has investigated low-fat pointers that encode metadata within the native pointer to make it compatible with metadata-unaware code. In terms of object-related metadata, metalloc is a heap allocator that has been designed with fast lookup of metadata for heap objects in mind.

Speculative Execution is a known approach employed by CPUs: before a branch condition is actually evaluated, the execution pipeline is already filled with the instructions of the path taken according to the branch predictor. If the branch prediction turns out wrong, the results of the speculative execution are thrown away. This concept may be extended to the operating system: an endolithic OS kernel offers execution as a service by speculatively executing application process slices inside a kernel thread. Supervision of this execution allows automatic remediation in case of a fault.

SUMMARY

According to a first aspect, the present invention is embodied as a computer-implemented method for performing safety check operations. The method comprises steps that are implemented while executing a computer program, which is instrumented with safety check operations. As a result, this computer program forms a sequence of ordered instructions. Such instructions comprise safety check operation instructions, in addition to generic execution instructions and system inputs. System inputs allow the executing program to interact with an operating system, which manages resources for the computer program to execute. A series of instructions are identified while executing the computer program. Namely, a first instruction is identified in the sequence, as one of the safety check operation instructions, in view of its subsequent execution. After having identified the first instruction, a second instruction is identified in the sequence. The second instruction is identified as one of the generic computer program instructions. Execution of the second instruction identified is started, irrespective of a completion status of the first instruction. Next, and after having identified the second instruction, a third instruction is identified in the sequence. The third instruction is identified as one as one of the system inputs. There, completion of execution of the first instruction (the safety check operation instruction) is required prior to completing execution of the third instruction (the system input).

The above approach allows generic computer program instructions to execute independently from the safety check operations, at least in a certain extent. That is, the completion of the program safety checks is deferred to a later point in time after it is issued. Only the system inputs makes it mandatory for the execution of the safety checks to complete. As a result, the program safety checks can be performed asynchronously with the generic computer program instructions. This results in a more efficient computation in practice. For instance, the first instruction and the second instruction may be executed in concurrent execution threads.

In embodiments, the execution itself of the safety checks is deferred. I.e., using the above terminologies, a decision is made to defer the execution of the first instruction upon identifying the first instruction (while executing the computer program). This is preferably achieved by enqueuing the first instruction identified in a queue, which may already comprise one or more previously enqueued safety check operation instructions. More preferably, any instruction enqueued in said queue is constrained to be enqueued as an append-only log. This way, the integrity of the monitor queue can be preserved.

In embodiments, the method comprises executing part or all of safety check operation instructions enqueued. That is, upon identifying a system input, completion of execution of one or more of the last safety check operation instructions enqueued is required, prior to completing execution of the system input. In addition, the method may for instance comprises forcing execution of part or all of safety check operation instructions enqueued upon detecting that the queue is full. Typically, a safety check operation instruction is executed using internal program state information built based on previously executed safety check operation instructions.

The system inputs in the sequence formed by the executed computer program may for instance comprise system calls. The system inputs may advantageously comprise additional input points, e.g., one or more of an interrupt, an exception, a fault, a trap, copying data from a user space into a kernel of the operating system, and a memory-mapped I/O operation. On the other hand, the safety check operation instructions typically pertains to operations relating to one or more of a pointer bound, a pointer allocation, a pointer deallocation, a memory location, a buffer size, and a buffer location in memory.

In embodiments, the present method further comprises inserting the safety check operation instructions in the program, prior to executing the computer program. The inserted safety check operation instructions typically comprise contextual information and inputs for executing corresponding safety check operations.

According to another aspect, the invention is embodied as a computerized system. The latter comprises a memory, storing a computer program and an operating system configured to manage resources for said program to execute. As discussed above, the computer program is instrumented with safety check operations, so as to form a sequence of ordered instructions. The system further comprises one or more processors configured to execute each of the operating system and the instrumented computer program. It further includes a reference monitor. The latter is configured to take steps as evoked above, while the computer program executes. That is, the reference monitor may, in operation, identify a first instruction, as one of said safety check operation instructions, for subsequent execution thereof. Then, and after having identified the first instruction, it may identify a second instruction as one of said generic computer program instructions and instruct to start execution thereof, irrespective of a completion status of the first instruction. Next, and after having identified the second instruction, the reference monitor may identify in the sequence a third instruction as one of said system inputs and instruct to require completion of execution of the first instruction prior to allow an execution of the third instruction to complete.

In variants, the reference monitor implements only a part of such steps, the other steps being implemented by the operating system and the executing computer program.

In embodiments, the reference monitor is implemented as a computer program stored on the memory and executable by the one or more processors. The reference monitor may be configured to run in a kernel mode or in a user mode. In variants, the reference monitor is implemented as a hardware component, configured to interact with the one or more processors.

In embodiments, the computerized system further comprises a queue provisioned in the memory, so as to allow the first instruction to be enqueued therein, upon identifying the first instruction (while executing the computer program), whereby execution of the first instruction is deferred, in operation.

According to a final aspect, there is provided a computer program product for performing safety check operations while executing a computer program. The latter is instrumented with safety check operations, as explained above. The computer program product comprises a computer readable storage medium having program instructions embodied therewith, the program instructions being executable by one or more processors, to cause to take steps according to embodiments of the above method.

Computerized systems, methods and computer program products embodying the present invention will now be described, by way of non-limiting examples, and in reference to the accompanying drawings.

BRIEF DESCRIPTION OF SEVERAL VIEWS OF THE DRAWINGS

The accompanying drawings show simplified representations of computerized systems and units, or parts thereof, as involved in embodiments. Similar or functionally similar elements in the figures have been allocated the same numeral references, unless otherwise indicated.

DETAILED DESCRIPTION

The following description is structured as follows. First, general embodiments and high-level variants are described. The next section addresses more specific embodiments and technical implementation details.

Figure 3:
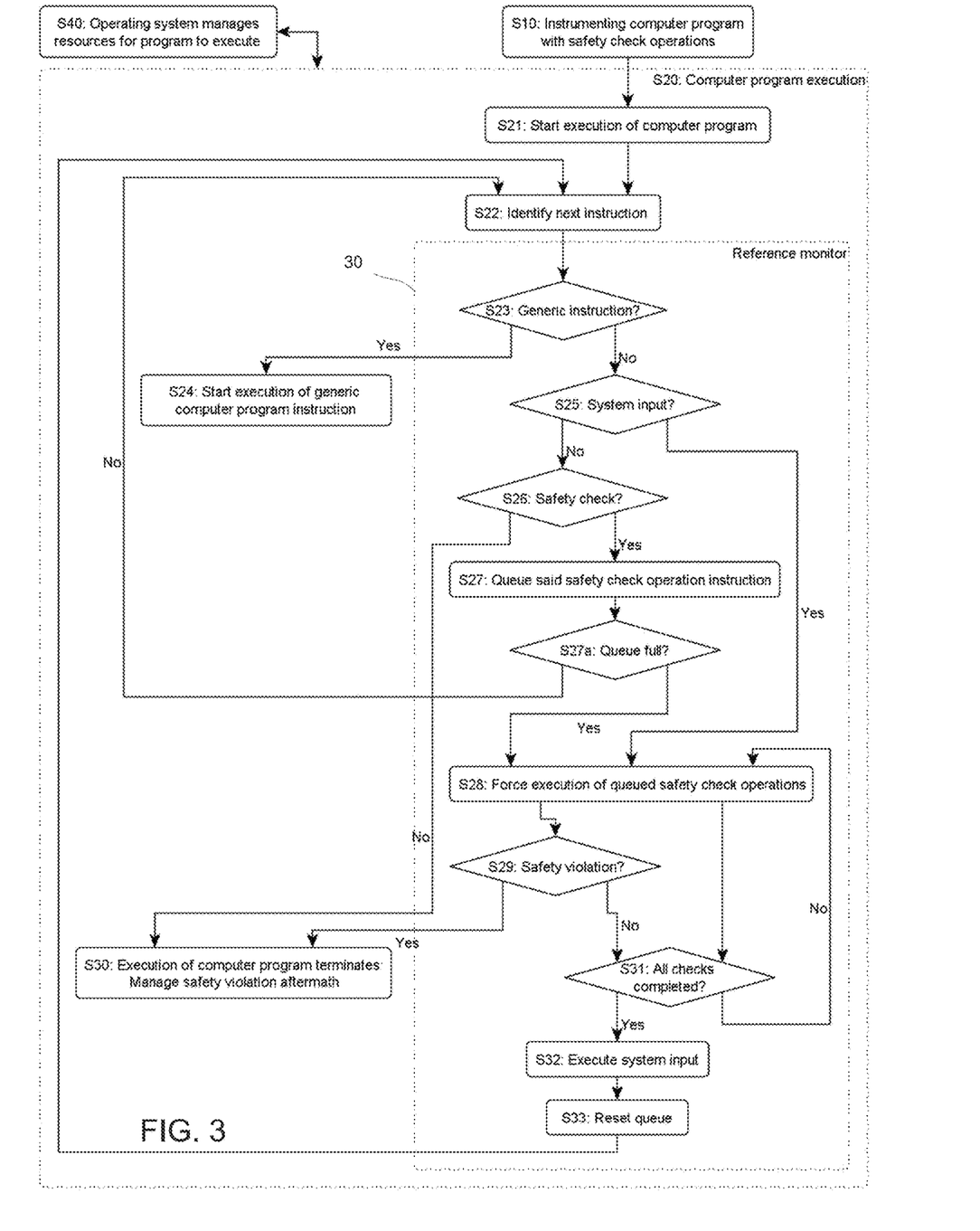
FIG. 3 is a flowchart illustrating high-level steps of a method for performing safety check operations, as involved in embodiments.
Figure 4:
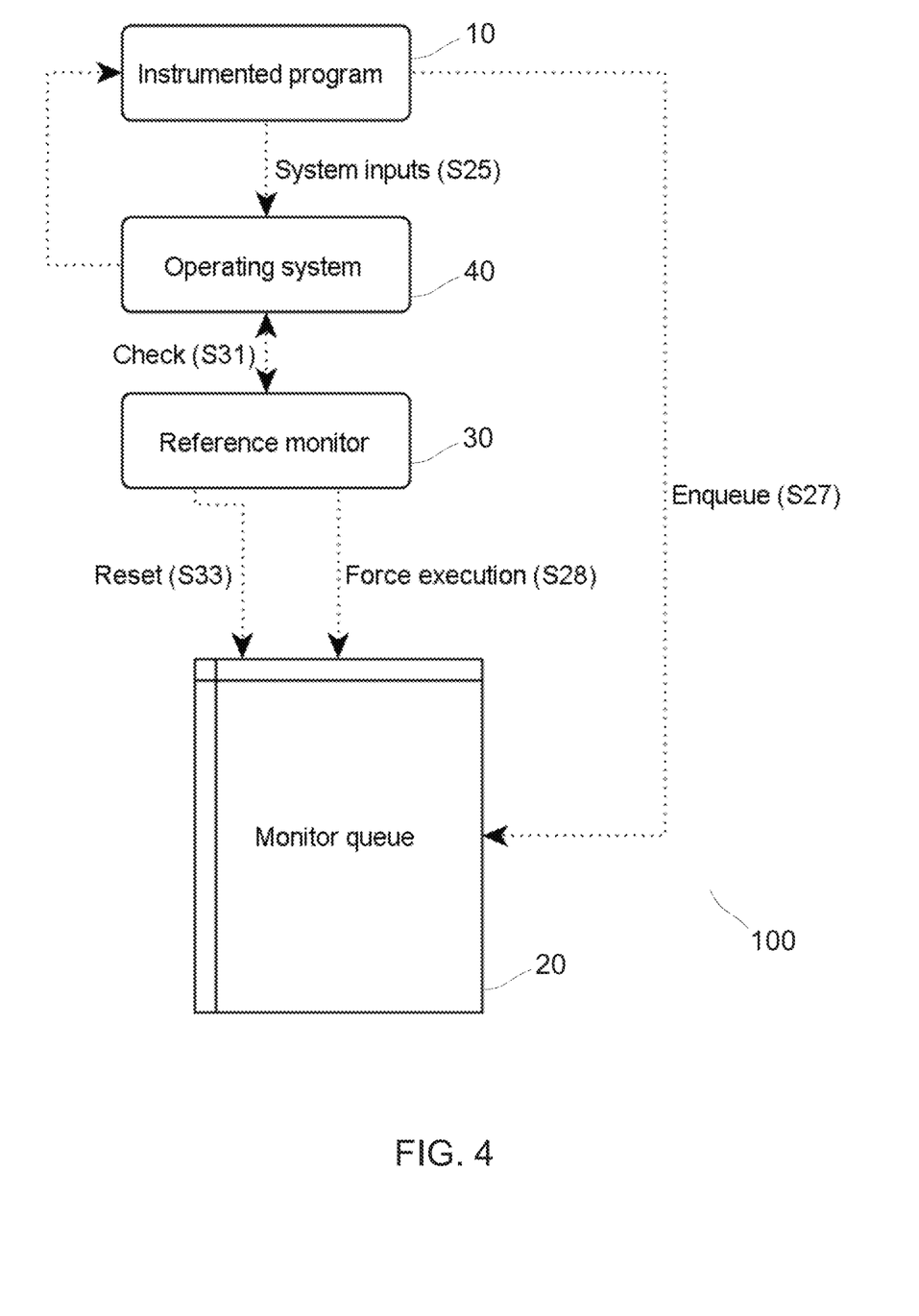
FIG. 4 is a high-level diagram schematically illustrating selected components of a computerized system according to embodiments, and how such components basically interact, according to embodiments of the present method.

In reference to FIGS. 3 and 4, an aspect of the invention is first described, which concerns a computer-implemented method for performing safety check operations.

This method involves a number of steps aiming at performing safety checks, while executing a computer program 10 (see, e.g., step S20 in FIG. 3). This program 10 includes generic execution instructions, as well as system inputs for the executing program to interact with an operating system (OS) 40. The OS manages S40 resources for this program 10 to execute. The program 10 is instrumented S10 with safety check operations. As a result, the program being executed forms a sequence of ordered instructions that comprise safety check operation instructions, in addition to the generic execution instructions of the program and the system inputs, as shown in the right-hand-side column of FIG. 2.

The following steps of the method are carried out in a given, relative order. This relative order may at first sight appear to differ from the order in which they appear in an iterative process such as depicted in FIG. 3. However, iterating over the steps of this process happens to preserve the relative order in which essential steps of the present methods are carried out. In addition, the one skilled in the art may appreciate that the identification steps of the process of FIG. 3 may occur in a different order, while preserving the relative order in which essential steps of the present methods are carried out. These essential steps are described below.

Assume that a first instruction is identified S26 in the program sequence, which instruction corresponds to one of the safety check operation instructions. Step S26 is a preliminary step necessary for the subsequent execution S28 of the safety check operation instruction. However, according to the present invention, this execution S28 need not be started immediately. All the more, the present method does not necessarily require completion of the execution of this safety check operation instruction, prior to executing a next instruction.

In that respect, and after having identified the first instruction, a second instruction may be identified S23 in the sequence. Assume that the second instruction identified S23 corresponds to one of the generic computer program instructions of the sequence. Then, execution of this generic instruction can be immediately started S24, irrespective of the completion status S31 of the previous safety check operation instruction.

After having identified this generic instruction, a further instruction may be identified S25 in the program sequence, which instruction may instance correspond to one of the system inputs. This time, the present method requires S28 completion S31 of the execution of the first instruction (i.e., the safety check operation instruction), prior to completing execution S32 of the third instruction (the system input) or, preferably, prior to start execution of the third instruction.

The various types of instructions are ordered in the sequence formed by the executing program 10. Thus, such instructions are meant to be executed in an order that is determined by their respective ranks in the sequence. As assumed in FIG. 2, the program 10 may typically be a compiled program, involving a number of generic machine instructions, e.g., compiled (generic) instruction #1, compiled (generic) instruction #2, etc., in which safety check operation instructions are interleaved (e.g., safety check operation instruction #1, safety check operation instruction #2, etc.). In addition, system inputs are involved along the sequence (e.g., system input #1), to allow interaction with the OS. The safety check operation instructions are typically inserted by a compiler, when compiling the source code, based on the original (source) instructions (source instruction #1, source instruction #2, etc.). Yet, the safety check operation instructions may not be explicitly provided in the source program, as known per se. On the contrary, the system inputs are typically provided, explicitly or not, by instructions of the source code. Contrary to generic program instructions (which involves an internal execution), system inputs causes the executing program 10 to interact with the OS 40.

The system inputs typically implements system calls. Preferably, they further comprise interrupts, exceptions, faults, traps, operations aiming at copying data from a user space into the OS kernel, and/or memory-mapped I/O operations. The user space is a defined memory space a domain where the user programs run. For comparison, safety check operation instructions typically pertain to operations relating to pointer bounds, pointer allocations, pointer de-allocations, memory locations, buffer sizes, and/or buffer location in memory.

Figure 2:
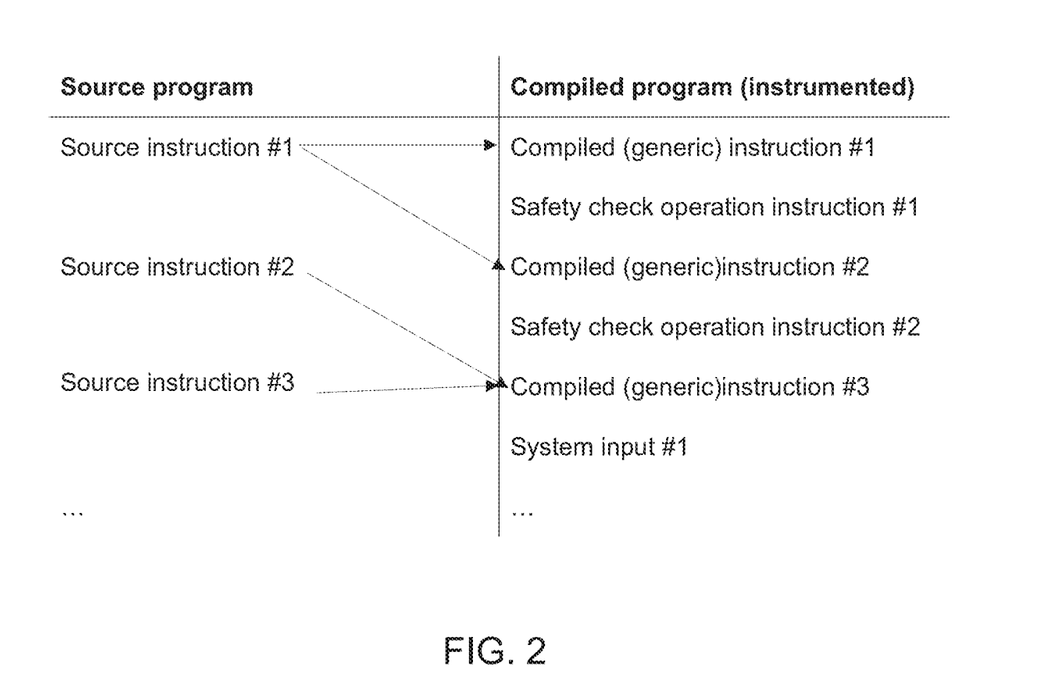
FIG. 2 is a table that naively depicts, on the one hand, a sequence of ordered instructions in a source code and, on the other hand, a sequence of ordered instructions as obtained after compilation, i.e., in a compiled program, which is instrumented with safety check operations, as involved in embodiments.

Compiling the original (source) instructions results in a given order of compiled instructions, as shown in the right-hand-side column of the table of FIG. 2. The mapping between original instructions and the final, compiled instructions depends on the nature of the source instructions, the programming language used, the compiler, etc. For the sake of illustration, a naïve order of instructions and mapping between source and compiled instructions are assumed in FIG. 2. In an implementation, the proportions of system inputs, generic instructions and safety checks may differ.

To more clearly establish the principles at work here: the first, second and third instructions (identified at step S26, S23 and S25, respectively) as described above may be regarded as corresponding to the last three instructions in the table of FIG. 2 (right-hand-side column), respectively. That is, the first, second and third instructions may correspond to: (i) the safety check operation instruction #2; (ii) the compiled (generic)instruction #3; and the system input #1, respectively.

Now, although the computer program 10 is typically an executable (i.e., as obtained after compilation), other forms of computer program may be contemplated, which are not necessarily compiled programs. That is, any form of computer program that includes safety checks can be contemplated. Examples of such programs include just-in-time generated code, interpreted programs, and bytecode (virtual machine) based programs.

In all cases, the computer program 10 that executes is assumed to comprise one or more safety check operation instructions and one or more system inputs, interleaved with generic computer program instructions. As a result, the safety check operations instructions and system inputs are intermingled with the generic machine instructions.

When a system input is identified S25 in the sequence, then completion S31 of execution of one or more of the pending safety checks is required S28-S31 prior to executing or completing execution S32 of this system input. As one may realize, this allows generic computer program instructions to execute independently from the safety check operations, at least in a certain extent. That is, the completion of a program safety check is deferred to a later point in time after it is issued. Only the system inputs make it mandatory for the execution of the safety checks to complete. As a result, the program safety checks can be performed asynchronously with the generic computer program instructions. Eventually, this results in a more efficient computation. For instance, the first instruction and the second instruction may be executed in concurrent execution threads.

That is, the execution of the safety checks may involve dedicated threads, run in parallel to threads in which generic instructions are executed. Thus, the execution of a safety check operation may already have started as a subsequent generic instruction (in the sequence) executes. I.e., starting the execution of the subsequent generic instruction is not subjected to the completion of a previous safety check operation, which results in a more efficient, overall execution of instructions in the program sequence. Yet, when it comes to execute a system input (which is more critical than a mere generic computer program instruction), completion of one or more of the pending safety checks is required.

On the contrary, prior art solutions usually consist in requiring completion of any safety check instruction before actually starting execution of the next instruction (be it a generic computer instruction or a system input). In contrast with prior solutions, the completion of the program safety checks is deferred in the present approach, which allows a more efficient computation.

In embodiments as contemplated herein, not only the completion of the safety checks is deferred, but also the moment their execution is started. I.e., instead of immediately starting the execution of a safety check operation instruction, decision is made to defer S27 this execution, upon identifying S26 this safety check operation instruction (while executing S20 the computer program 10), as illustrated in FIG. 3. Execution of the generic computer instructions can thus be started S24, immediately upon identification S23 thereof, and irrespective of whether execution of a previously identified safety check has started or not. Safety checks can therefore be fully, asynchronously performed.

Execution of pending safety check operations may be started upon identifying a system input. Yet, since some of the system inputs may require completion of all the pending security checks, it may be more efficient, computationally speaking, to start executing any pending safety check operation as soon as possible. Yet, even in that case, the completion of the security checks is deferred (rather than the start of their execution).

In preferred embodiments, a queue is involved, in order to defer execution of the safety checks. Namely, the safety check operation instructions are enqueued S27 in a queue 20, i.e., as a list of retrievable instructions. In operation, the queue 20 may typically comprise one or more previously enqueued safety checks operation instructions.

The enqueued instructions are preferably executed in their order of insertion in the queue. That is, the queue 20 is preferably "append-only". I.e., any instruction enqueued in the queue 20 is constrained to be enqueued as an append-only log in that case. This way, the integrity of the monitor queue 20 is preserved between enqueue time and access time.

In FIG. 3, steps S28-S31 cause to execute all safety check operation instructions enqueued, e.g., one after the other, in their order of insertion, upon identifying a system input and prior to completing execution S32 of the system input (and even prior to starting execution thereof in that case). Now, in variants, and depending on requirements set forth by the system inputs, a system input may in fact requires completion of only a part of the pending safety check operation instructions. Most simple, however, is to require execution of all enqueued instructions, prior to execute any system input as identified at step S25. This may all the more be desired where safety check operation instructions are executed using internal program state information built based on previously executed safety check operation instructions.

The queue provisioned in memory may possibly have a limited size. Be it for this reason, it may be needed to force S28 execution of part or all of the queued safety check operation instructions upon detecting S27a that the queue 20 is full. The limit size of the queue may be set in accordance with performance targets, to avoid that a "queue full" event occurs too often and affects performance.

In embodiments, the present methods may further comprise inserting S10 the safety check operation instructions in the program 10, prior to executing the computer program 10. Step S10 is typically performed by a compiler. Yet, in variants, the safety check operation instructions may be inserted on-the-fly, when interpreting a program. In both cases, safety check operation instructions result to be interleaved with other instructions, as noted earlier. The inserted safety check operation instructions will typically include contextual information and inputs for executing the corresponding operations. In fact, an inserted safety check operation instruction may include any information as usually used in IRMs. However, in the present case, the corresponding operation is meant to be deferred, e.g., enqueued, rather than be executed immediately, as with usual IRMs.

Figure 1:
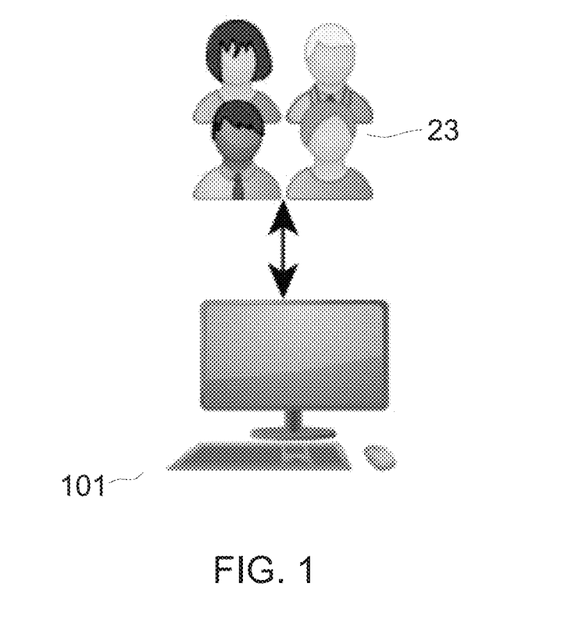
FIG. 1 schematically represents a typical context in which embodiments of the invention are implemented, i.e., where users interact with a computerized unit.
Figure 5:
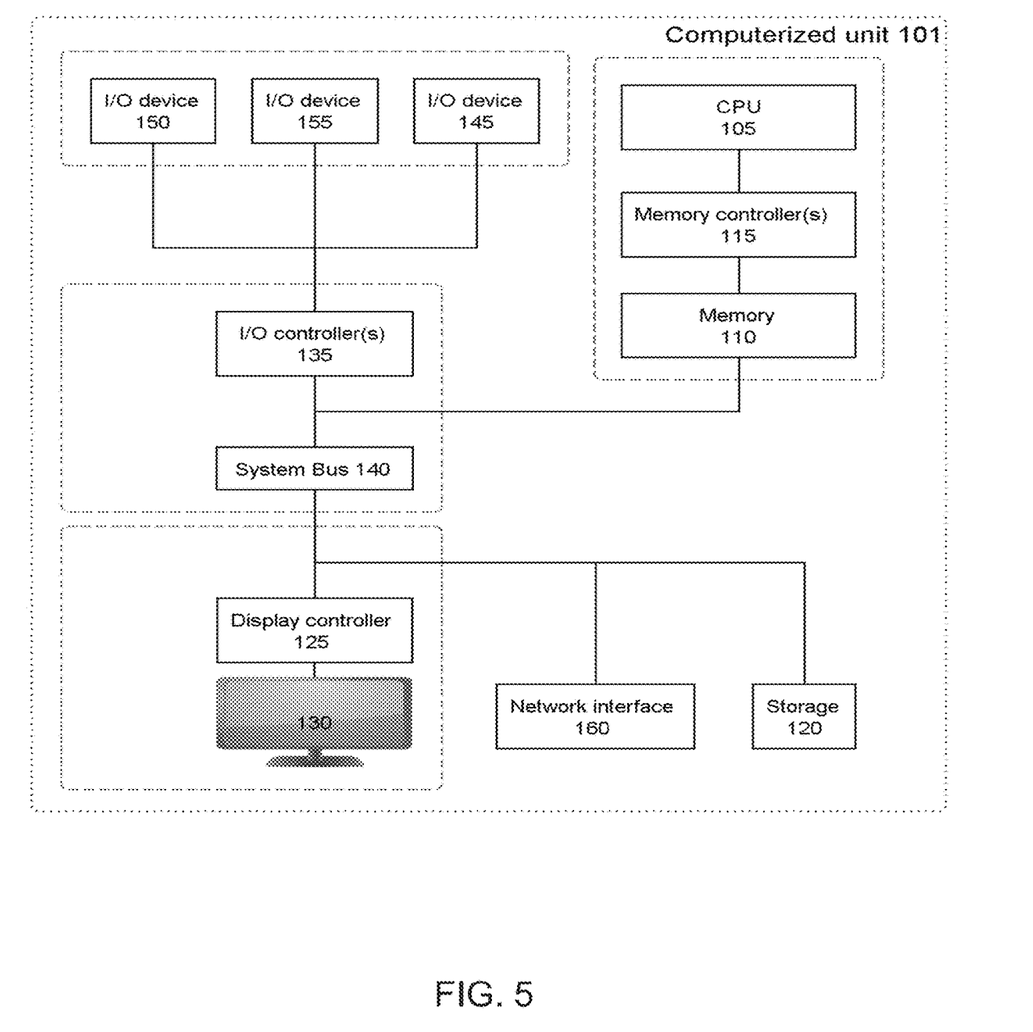
FIG. 5 schematically represents components of a general purpose computerized unit such as seen in FIG. 1, and suited for implementing one or more method steps as involved in embodiments of the invention. This computerized unit may support a computerized system as depicted in FIG. 4.

Referring now more specifically to FIGS. 1, 4 and 5: another embodiment of the invention is described, which concerns a computerized system 100, which involve both software and hardware components. An example of such a system 100 is depicted in FIG. 4, which depicts components 10-40 interacting so as to perform safety check operations. Additional hardware components involved in the system 100 are shown in FIG. 5. FIG. 5 depicts internals of a computerized unit 101, which may support a system 100 such as depicted in FIG. 4, in operation.

The system 100 further comprises a memory 110, storing the computer program 10 and an OS 40. The OS 40 is configured to manage resources for this program 10 to execute. As explained earlier, the computer program 10 is instrumented S10 with safety check operations. The sequence of ordered instructions it forms further comprises system inputs for the program 10 to interact with the OS 40, in addition to generic instructions. The system 100 also comprises one or more processors 105, which are configured to execute each of the OS 40 and the computer program 10.

Moreover, the system 100 includes a reference monitor 30. The latter is configured to take steps of computerized methods as described herein. Namely, as the computer program 10 executes, the reference monitor 30 may implement steps as described earlier in reference to FIG. 3. That is, the reference monitor 30 may identify S26 a safety check operation instruction, in view of a subsequent execution S28 thereof. Next, the reference monitor 30 may identify S23 a generic computer program instruction and instruct S24 to start execution thereof, irrespective of a completion status of the safety check operation instruction. Then, the reference monitor 30 may identify S25 a system input and, in that case, instruct S28 to require completion S31 of execution of the safety check operation instruction prior to allow an execution S32 of the system input to complete, as explained with reference to FIG. 3.

Defined in a broad sense, the reference monitor 30 may be regarded as the entity that implements each of steps S23, S25-S29, and S31-S33 in FIG. 3. Preferably though, some of these steps are primarily managed by the OS (e.g., by the OS kernel), as suggested in FIG. 4. For example, a system input would, in the first place, be detected by the OS, which then informs the reference monitor 30 for the latter to force execution of enqueued safety check operation instructions. In addition, the safety check operation instructions may actually happen to be enqueued independently from the reference monitor 30, upon executing the program 10, as further assumed in FIG. 4, and contrary to what FIG. 3 suggests. Thus, the effective role of the reference monitor 30 shown in FIG. 4 is more restricted than that of FIG. 4.

Now, in embodiments where the reference monitor 30 is implemented as a computer program (stored on the memory 110 and executable by the processors 105), the reference monitor 30 may typically be implemented as part of the OS 40, e.g., in a kernel mode. In that case, the distinction between the OS and the reference monitor is incidental. In variants, a soft-coded reference monitor 30 may be configured to run in a user mode. Here the distinction between steps performed by the OS kernel and other program components becomes more relevant. It is understood that the system 100 is generally configured to implement steps of the method described herein.

In variants, the reference monitor may be implemented as a hardware component configured to interact with the one or more processors 105 and, in particular, with the OS 40 as the latter executes, thanks to said processors.

In all cases, a queue 20 is preferably provisioned in the memory 110 of the system 100, so as to allow safety check instructions to be enqueued S27 therein, as explained earlier. Eventually, this makes it possible to defer execution of the safety check instructions, in operation. Additional aspects of the computerized system 100 are discussed in greater detail herein below.

According to a final aspect, the invention can be embodied as a computer program product for performing safety check operations. This computer program product comprising a computer readable storage medium having program instructions embodied therewith. The program instructions are executable by one or more processors, to cause to take steps according to the computerized methods disclosed herein. This aspect is further discussed in greater detail herein below.

The above embodiments have been succinctly described in reference to the accompanying drawings and may accommodate a number of variants. Several combinations of the above features may be contemplated as will be discussed in various examples provided herein below.

There is now further described the concept of deferring inline reference monitor checks, i.e., in order to perform them asynchronously, in one embodiment. From a performance standpoint, this approach is promising: on the one hand, inline checks slow down the execution; and on the other hand, they are very unlikely to fail. They may accordingly be removed from the "fast execution path". Because the rate of single thread CPU performance fell down over the past years, with increase in the number of CPU cores performance, performing such checks in a concurrent execution thread is enticing. However, from a security standpoint, this introduces interesting challenges. In particular, this may lead to an inherent race condition, as the checks may fail only after the safety violation occurs, rather than before (hereinafter referred to as the "monitor race problem").

In this setting (where checks are performed in a concurrent execution thread), attackers could take advantage of the time window between the safety violation and the deferred check to achieve their goals. Now, in order to effectively achieve their goals after corruption, attackers need to eventually interact with the operating system (OS). Identifying interaction points with the OS (and preferably all of them) thus becomes pivotal. In addition, the integrity of the deferred checks should preferably be fully maintained, in order to ensure the monitor's effectiveness.

In the following, specific embodiments are explored, where inline reference monitor checks are deferred (accordingly referred to herein as "deferred reference monitors"). In one embodiment, there is considered the applicability of deferred reference monitors to state-of-the-art defense mechanisms, as well as considerations on design and implementation of deferred reference monitors with respect to the monitor race problem identified above. An actual implementation (i.e., a prototype, called DEFER) of a deferred reference monitor and an evaluation of the potential performance improvement are described in greater detail herein below.

Deferred reference monitors as proposed herein can be applied to a number of memory and program safety mechanisms that currently use IRMs. The threat model derives from that of the mechanism itself. The attacker's ultimate goal is to have an impact on the system or on neighboring systems, e.g. issuing system calls, writing to files or communicating over the network. This interpretation of the security model and its reality are further justified.

In particular, the threat model of the DEFER prototype presented herein (which applies the deferred reference monitor principle to a spatial memory safety defense), assumes a strong attacker. The latter is assumed to be in control of a vulnerability that provides the attacker with an arbitrary memory read or write primitive, with the goal of issuing arbitrary system calls (or other input to the system).

Deferred Reference Monitors

As mentioned, a deferred reference monitor is assumed to be a monitor whose checks are performed asynchronously. FIG. 4 depicts the components involved in such a design. The target instrumented program 10 is a program instrumented with enqueue calls. These calls replace inline operations that would occur in a corresponding IRM implementation (e.g., bounds checks before dereferencing for spatial memory safety implementations). They put in the monitor queue 20 the information necessary for the safety checks to be performed by the monitor 30: the monitor queue 20 is an append-only log of all program events that the monitor needs to check. At a later point in time, e.g., when a system call occurs, the OS 40 calls the deferred monitor 30 to perform all enqueued checks. In the meantime, the deferred monitor may have been performing these checks concurrently with the execution of the generic instructions of the program 10. To perform the checks, the deferred monitor needs to access the monitor queue and possibly use additional internal state built using past queue operations (e.g., in the case of bounds checks, information on pointer allocation). If all checks pass, the deferred monitor empties the queue and resumes the current OS action. If not, a safety violation is detected S29 and the program is terminated S30, as otherwise illustrated in FIG. 3.

The present deferred reference monitor implementations preferably satisfy the following properties which are described in greater detail herein below:

Monitor Queue Integrity: The integrity of the monitor queue should ideally be preserved between enqueue time and access time by the deferred monitor. Thus, the queue is preferably made append-only to the target program 10 during this time.

Complete Mediation of System Inputs: To ensure the monitor races do not impact security guarantees, the process should preferably not be able to have any external system impact (after the safety violation occurs, but before the check is performed by the monitor).

Enqueue Performance: For deferred checks to be advantageous from a performance standpoint, the cost of enqueuing an operation should be less than the cost of performing the operation inline.

First, concerning the monitor queue integrity, and without loss of generality, it can be assumed that an attacker executing a monitor race gains arbitrary code execution (or a weaker primitive, such as arbitrary write) in the context of the target program, using a vulnerability that should be detected by the checks of the reference monitor. At this point in time, pending checks in the queue will include the checks corresponding to the vulnerability used to gain arbitrary code execution: if not, the attacker loses the race and the program is terminated. The natural target for the attacker is therefore to overwrite all pending checks: this explains the additional need for monitor queue integrity. Several ways to achieve practical monitor queue integrity are proposed in the description herein below.

Concerning now the complete mediation of system inputs: in the same attack scenario, another target for the attackers may be to use their arbitrary code execution capability to directly achieve their goals. For instance, if attackers want to obtain sensitive program data from the target program 10, they may perform a write-like system call to send such data over the network. In this scenario, the monitor 30 needs to make sure all pending checks have passed by the time the network I/O under the input of the target program is executed. In general, at any external input of the target program 10, here called a "system input" or an "input point" of the OS, the monitor should preferably perform all pending checks. Such system inputs are proposed in the description herein below.

At present, concerning the enqueue performance: the enqueue operations are inlined and therefore impacts the performance. Thus, enqueuing operations should preferably take less wall clock time than required for performing the corresponding operation inline. Else, no performance benefit is gained from deferring checks. Yet, as is observed, this condition often holds in practice.

Applications

In the following, a selection of defenses against memory corruption are addressed, which make use of an inline reference monitor. Whether and how such defenses can be used with a deferred reference monitor as disclosed herein is discussed herein below.

Methods for memory safety are discussed below with reference to Table 1 herein below, which aim at entirely preventing memory corruption. Table 1 gives an overview of how the following policies can be implemented by a deferred reference monitor by showing which parts of the program state need be added to the monitor queue on a certain program event. Spatial memory safety is first discussed. Temporal memory safety is subsequently addressed.

More particularly, Table 1 describes deferred reference monitoring applied to memory safety defenses, and particularly shows which program events and state information is relevant for each defense. Deferred reference monitoring lends itself especially to combining defenses, as events such as pointer assignment only require enqueuing two items while metadata propagation can be deferred.

Dereferencing an out-of-bounds pointer violates spatial memory safety. In a more restricted scenario that reflects the typical buffer overflow, memory addresses are calculated in a base+offset manner, where the offset is incremented step by step. This provides an attacker with a linear memory write primitive. In less restricted scenarios, the offset directly depends on attacker-controlled input, providing an arbitrary write primitive. Defenses keep track of metadata that allows to check a pointer against a lower- and an upper bound before dereferencing. There are two common approaches to associating metadata with a pointer. On the one hand, fat pointers are data structures that contain both the pointer target and the metadata. While this has the advantage of having the metadata readily available, handling of fat-pointers does not go along well with legacy C/C++ code. On the other hand, metadata can be kept in separate memory regions, requiring potentially more complex and thus costly look-up procedures. Apart from creating metadata at allocation time, it also needs to be propagated during program execution on pointer assignment.

For example, Softbound is a bounds-checking implementation for clang/llvm. It maintains a separate metadata table that holds base and bound for each pointer. Metadata is propagated on assignment and checked on pointer dereferences.

TABLE 1

| Program event | Spatial memory safety | Temporal memory safety | Type safety |
| --- | --- | --- | --- |
| Allocation | Pointer address Bounds | Pointer address Unique allocation identifier | Pointer address Pointer type |
| Deallocation | — | Unique allocation identifier | — |
| Pointer assignment | Pointer address of Source and target | Pointer address of Source and target | Pointer address of Source and target |
| Pointer dereference | Pointer address Pointer value | Pointer address | — |
| Downcast | — | — | Pointer address Cast target type |

The deferred reference monitor approach applies well to spatial memory safety implementations that store metadata separately. Such solutions require costly metadata lookups from memory for both bounds propagation as well as bounds check. On memory allocation, one may enqueue the pointer address and the bounds of the allocation. On pointer assignment, the address of both the source and the target pointer are enqueued, whereas on pointer dereference, one may enqueue the address of the pointer as well as its value. The monitor queue represents a consistent trace of the changes to the program state that allows spatial memory safety to be checked.

Next, dereferencing a dangling pointer violates temporal memory safety. In a use-after-free scenario, a pointer's pointee is freed, but the pointer is not invalidated and is instead still used by a program's code. A specific instance of the use-after-free scenario is the double free, where free( ) is invoked on a dangling pointer, potentially corrupting heap management. Again, the worst possible outcome is providing an attacker with an arbitrary write primitive. Defenses need to ensure that whenever a pointer is dereferenced, it actually points to an allocated memory region.

The so-called Compiler-Enforced Temporal Safety for C (CETS) achieves temporal memory safety with the following approach: Each allocation region has an identifier, which is unique in the sense that identifiers are never reused. CETS uses two metadata tables: one that associates identifiers with pointers and one that associates identifiers with an allocation status indicator. On pointer assignment, target pointers inherit the identifier associated with the source pointer. On dereference, CETS checks that the allocation region corresponding to the identifier is still valid. In one embodiment, this requires a lookup in both tables.

As with spatial memory safety, the approach can benefit significantly from deferring, especially with respect to metadata management. On memory allocation, the pointer address and the unique identifier for the allocation are enqueued. When an allocation is freed, the unique identifier for the allocation is enqueued. On pointer assignment, the addresses of both source and target pointer are enqueued. On pointer dereference, the address of the pointer is enqueued. Replaying this trace of memory accesses with metadata allows temporal memory safety to be checked.

Concerning now type safety: in C++, downcasting is the process of converting a base class pointer to a derived class pointer. In case of type confusion, i.e., downcasting to a pointer of an incompatible type, memory can be corrupted if the underlying memory layout of the objects is different. Defenses keep track of the type of a pointer and check for type compatibility on dynamic casts. Depending on the implementation, this can involve traversing the class hierarchy.

Type Sanitizer is an approach to type safety that uses two type metadata tables, one for type layouts and one for type relationships. In addition, it uses a special metadata storage service to keep track of the pointer-to-type mapping. While casts do typically not occur as often as, e.g., pointer dereferences, the check itself is comparatively costly.

Applying the deferred reference monitor approach, the address of the pointer can be enqueued together with its declared type on pointer creation. On assignment, metadata propagation can be enabled by enqueuing the addresses of the source and target pointer. On a downcast, the address of the pointer is enqueued together with the target type.

Defenses based on program integrity leverage program analysis to determine the input for integrity policies that have to hold during program execution. They might allow for memory corruption, but detect it using policies for program integrity. Table 2 gives an overview of how the following policies can be implemented using deferred reference monitors.

The table 2 shows which program events and state information is relevant for each defense by applying deferred reference monitors to defenses based on program integrity.

TABLE 2

| Program event | Data Integrity | Data Flow Integrity | Control Flow Integrity |
| --- | --- | --- | --- |
| Memory read | — | Memory address | — |
|  | — | ID of reaching definition set | — |
| Memory write | Instruction pointer | Instruction pointer | — |
|  | ID of memory region | Memory address | — |

TABLE 2-continued

| Program event | Data Integrity | Data Flow Integrity | Control Flow Integrity |
|---|---|---|---|
| Indirect control flow transfer | — | — | Instruction pointer Control flow target |

Write integrity testing (or WIT) enforces points-to sets. Any time a pointer is dereferenced in the course of a write access, WIT checks that it only writes to a memory region that is within its pre-calculated points-to set. To be able to perform the check at runtime, WIT assigns unique IDs to objects and memory write accesses that may alias each other. As an optimization, WIT does not check memory writes that have been deemed safe by a static pointer range analysis, i.e., proven not to be able to write outside their points-to set. With deferred reference monitors, the program location as provided by the instruction pointer can be enqueued, as well as the ID of the accessed memory region on a memory write. This is sufficient information to check the dereference against the pre-calculated set of IDs.

Data flow integrity (DFI) enforces reaching definition sets. In program analysis, reaching definition sets for the use (read) of a variable are the last instructions that could have potentially defined (written) that variable. DFI performs a check against the reaching definition set whenever a variable is used. If an attacker uses an arbitrary memory write primitive, the instruction performing the memory write is typically not in the reaching definition set for the modified variable. DFI uses points-to analysis to compute the reaching definition sets and assigns a unique ID to each set.

Applying deferred reference monitors to DFI, one may enqueue the current program location as provided by the instruction pointer as well as the address on every definition, i.e., memory write access. On every use, i.e., memory read, one enqueues the address read together with the corresponding identifier for the reaching definition set. Going through this trace, the deferred check can then ensure that every read is preceded by a write that is in the reaching definition set.

Memory corruption vulnerabilities that allow an attacker to change a code pointer of the program enable the attacker to hijack the control flow of the program and achieve arbitrary code execution. Control flow integrity (CFI) defends against such attacks by enforcing the regular control flow of a program through evaluating the target of a code pointer before redirecting control flow. Examples for such control flow transfers are (indirect) jumps, calls, or return statements. Because inline checks in CFI approaches are often very simple and do not impact performance, the present approach (whereby safety checks are deferred) may not be beneficial. However, this would allow to implement context-sensitive solutions such as the so-called PathArmor solution, which make use of platform specific hardware features to efficiently determine the invocation context with low overhead to other platforms that do not have such hardware features. Essentially, the monitor queue can be used to replace a traditional shadow stack. That is, on every call, the return address is enqueued, while on every return, the target address is enqueued. In addition, programming constructs such as setcontext and unwinding the stack need be taken care of by enqueuing their semantics.

Prototype

At, a prototype, called DEFER, is described, which implements a deferred reference monitor for spatial memory safety, in software.

In this software-only instantiation, it was chosen to employ a producer-consumer pattern for the queue. The instrumented program 10 is the producer, pushing metadata updates and program state to a shared queue 20. The consumer, the monitor thread, is located in a kernel thread and is scheduled whenever the corresponding process is scheduled. The queue is filled until either one of two events occurs: either the queue is filled to its capacity or the main thread invokes a system call. DEFER's design ensures that the queue full event is handled by forcing the execution of either all or some of the enqueued checks so as to free up space in the queue.

There are multiple ways in which this can be achieved. E.g., by introducing appropriate capacity checks in the enqueue function or by forcing an access violation fault whenever the enqueue function is asked to place an entry past the end of the queue. The two approaches differ mostly in the way the overhead for the write-past-the-end check is distributed—evenly spread across all calls to enqueues or concentrated in the enqueue that violates the queue's bounds. Provided that the queue is large enough, the second approach is expected to be the most advantageous from a performance viewpoint. Either approach is equivalent from a security perspective.

Checks, in this case bounds checks for pointers, are performed on the current state of the program. If a check is deferred, it is ensured that it is performed on the state of the program at the time when the check would have been performed had it been inlined. As a consequence, the state at defer time need be captured and propagated together with the monitor's inputs. In the case of bounds checks, this means keeping bounds information for each pointer (base of pointer, size) in a table, and to propagate this metadata when pointer assignment occurs. This table is kept by the monitor thread in the kernel, and is queried when a bounds check is needed.

An alternative design would be, instead of dedicating a kernel thread for the monitor, to perform checks synchronously in the kernel at the system inputs. An advantage of the kernel thread approach is that checks are performed in parallel with the execution of the main thread, making use of potentially idle cores. The queue is therefore less likely to fill up and fewer unperformed checks are expected to be left when the program reaches the next system input (e.g., the next system call). This approach, however, relies on an extra thread and introduces additional overhead. Furthermore, checks are performed at random points in time with respect to the main thread execution flow. As a consequence, memory locality of accesses with respect to the queue and metadata table cannot be exploited as efficiently. Nevertheless, it is expected that the use of a dedicated thread to be the more performant implementation on simultaneous multi-threading (SMT) machines.

Concerning the monitor queue integrity and as stated herein above, the queue preferably need be protected against corruption by an attacker that modifies items in the queue to pass the checks. Three alternative ways of implementing this protection are considered: software fault isolation, randomization, and the use of hardware mechanisms such as memory protection keys. First, a simplified, targeted version of a software-fault isolation can prevent the process from writing to the memory area of the queue, leaving only a special enqueue function with the ability to do so. Such an approach, however, is potentially expensive and breaks compatibility with existing libraries that were not compiled with this SFI feature. In addition, it only effective insofar as the attacker gains arbitrary read or write, but not arbitrary code execution. Randomization would mean keeping the queue at a randomized location, and would therefore require both arbitrary read and write capabilities for the attacker to bypass. In addition, the read and write primitives need to occur "simultaneously" (assuming that the arbitrary read violates memory safety and is detected by the checks), i.e., without any system inputs in-between. It is understood that this may often hold in practice for most vulnerabilities, and may therefore provide a reasonable practical implementation route.

Finally, recent hardware-based, fine-grained memory protection (such as the Intel Memory Protection Keys) may prove to be a very good match. Only the enqueue function is given the key to access the check-queue, and if the rest of the process accesses that area, this will result in a trap. In addition, the enqueue function is written in a careful way. In particular, its append-only guarantees cannot easily be violated. Because switching keys does not require any system call, such memory protection mechanisms may provide a performant and robust way of implementing monitor queue integrity.

Concerning the complete mediation of system inputs, a naive implementation may assume that system calls are the only system inputs. In other words, attackers would require a system call in order to achieve their goals. However, implementing deferred checks at system calls may not always be sufficient, such that additional system inputs should preferably be taken into account. Two such examples are now discussed. Although such examples do not constitute an exhaustive list of all OS input points, the goal here is to show that such input points can be enumerated and modified to call the monitor, for it to perform the pending checks. First, in the case of a write system call, the buffer of the write is passed as a pointer. Well after system call entry, which is a system input where the monitor will be called, the buffer of the write is accessed by the kernel from its location in user-space. This is typically performed on Linux through the so-called copy_from_user call. At this point in time, it is possible that an attacker (who controls the second thread of the same process) makes use of a monitor race and overwrites the contents of the write buffer (through a memory corruption vulnerability). This means that copy_from_user is another system input where, after the copy occurs, the kernel should preferably call the monitor to ensure all pending checks have passed. Second, writes can occur without system calls, through memory-mapped I/O. In this scenario, a file is mapped through the so-called mmap syscall by the target instrumented program 10. Writes to that memory area will, after an initial page fault, only be written to the underlying storage in a writeback process driven by the page-cache implementation in the kernel (pages that are written by the process are marked as dirty by the MMU in the background). Therefore, in that case too, the page cache should preferably call the monitor to ensure that all pending checks for the process owning the page have passed before starting the writeback process.

Implementation and Evaluation

The design of DEFER is based on the assumption that deferring an IRM check is faster than performing it (see the "enqueue performance" described herein above). To evaluate this assumption, the prototype DEFER was built for memory safety. This prototype implementation instruments every pointer dereference, including function pointers, to enqueue the pointer address as well as its value for a deferred check. It also instruments every pointer assignment for metadata propagation to enqueue the address of the source and destination pointer. As a benchmark, the quicksort implementation provided by the GNU C library was used. Quicksort was chosen because it is CPU—rather than I/O bound and makes extensive use of pointer arithmetics. These program characteristics are representative for a stress test of defenses based on memory safety, since pointer operations need be instrumented and the corresponding overhead is not masked by I/O.

The overhead of DEFER was compared with known memory safety defenses. To that aim, DEFER was compiled with gcc version 5.4. As an input to quicksort there was supplied an array of 400.000 numbers. Time measurement was done using two calls to gettimeofday, right before and after the invocation of the main quicksort function. This ensures that potential setup cost of the defenses, such as setting up metadata tables, are not included in the measurements. The benchmark was run on an Intel i7-6700K Skylake CPU clocked at 4.00 GHz with 8M L3 cache. The results obtained have confirmed that quicksort could indeed be considered as a worst-case scenario the defenses compared as the overhead obtained by far exceeded the average performance impact as initially reported in the literature. DEFER fares comparably well, demonstrating that the cost of enqueueing the necessary information is substantially faster than performing the actual checks inline. In addition, DEFER's overhead was shown to be far less dependent on the number of checks employed—combinations of complicated checks might be able to work on little additional metadata.

Many defense mechanisms optimize performance by employing program analysis to remove unnecessary checks. In the case of spatial memory safety, these would typically be bounds checks on memory accesses with bounds that are not attacker-controlled. Depending on the defense application the same approach can be used when using DEFER, reducing the number of push accesses to the monitor queue.

Dedicated hardware support can substantially improve the performance of defense mechanisms. A typical example for this is gcc's—fcheck-pointer-bounds defense for spatial memory safety that relies on Intel's MPX. Memory Protection Extensions (MPX) is an extension to the Intel x86 ISA that provides hardware support for spatial memory checks. It introduces a set of bounds registers together with two new instructions, bndcl and bndcu, to check an address against the bounds in the registers. The instructions will trap if the check fails, requiring support from the operating system to take action upon these traps. Because there is a limited number of bounds registers, a new instruction, bndmov, has been introduced to be able to spill the registers to memory. MPX adds two additional instructions, bndldx and bndstx to maintain a 2-level radix tree data structure in memory that is used to look up and store bounds for a pointer. GCC's implementation, which follows the Softbound approach, benefits especially from the additional, dedicated registers that can cache bounds information and thus reduce the need to retrieve bounds information from memory. Along the same lines, DEFER can benefit from hardware support that caches the append operation and protects the monitor queue from unauthorized access.

Taking the hardware approach a step further, implementations such as MPX may also employ the DEFER approach and defer the bounds check to a later point in time. Up until this point, the CPU may carry on assuming that the checks have passed. This is similar to the speculative execution that CPUs already leverage today when predicting the outcome of a branch instruction.

In the embodiments described herein, there has explored the feasibility of using deferred reference monitors for safety checks. It has notably shown how such deferred checks can be implemented to deal with the "monitor race problem" and that a prototype implementation happens to outperform state-of-the art defenses by a large margin. This leads to the conclusion that while deferring reference monitor checks introduces additional complexity, it has the potential to perform even complex checks with reasonable overhead.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used, e.g., to implement functions/steps of the elements 10-40.

For instance, FIG. 5 schematically represents a computerized unit 101, e.g., a general-purpose computer, which may be used to implement a computerized system 100 such as shown in FIG. 4. In variants, the components 10-40 may be implemented across various, interconnected computerized units.

In exemplary embodiments, in terms of hardware architecture, as shown in FIG. 5, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. A system bus 140 may be present, in addition to the input/output controller 135.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 5, the software in the memory 110 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be provided in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the present methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices.

In addition, the I/O devices 145-155 may further include devices that communicate both inputs and outputs. The computerized unit 101 can further include a display controller 125 coupled to a display 130. In exemplary embodiments, the computerized unit 101 can further include a network interface or transceiver 160 for coupling to a network.

The network transmits and receives data between the unit 101 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for performing safety check operations, the method comprising:
executing a computer program instrumented with safety check operations, so as to form a sequence of ordered instructions that comprise safety check operation instructions, in addition to generic execution instructions of the program and system inputs for the executing program to interact with an operating system managing resources for said program to execute; and
while executing the computer program:
identifying in the sequence a first instruction, as one of said safety check operation instructions, and deferring execution of the first instruction for subsequent execution thereof by enqueuing the first instruction in a queue comprising at least one previously enqueued safety check operation instruction;
after having identified the first instruction, identifying in the sequence a second instruction as one of said generic computer program instructions and starting execution thereof, irrespective of a completion status of the first instruction; and
after having identified the second instruction, identifying in the sequence a third instruction as one of said system inputs for the executing computer program to interact with an operating system and requiring completion of execution of the first instruction prior to completing execution of the third instruction, the method further comprising:
executing part or all of safety check operation instructions enqueued, and
forcing execution of said part or all of safety check operation instructions enqueued in the queue upon detecting that said queue is full.

2. The method according to claim 1, wherein any instruction enqueued in said queue is constrained to be enqueued as an append-only log.

3. The method according to claim 1, wherein at least one of the safety check operation instructions is executed using internal program state information built based on previously executed safety check operation instructions.

4. The method according to claim 1, wherein the method further comprises executing the first instruction and the second instruction in concurrent execution threads.

5. The method according to claim 1, wherein the system inputs in the sequence formed by the executed computer program comprise system calls.

6. The method according to claim 5, wherein the system inputs further comprise one or more of:
an interrupt;
an exception;
a fault;
a trap;
copying data from a user space into a kernel of the operating system; and
a memory-mapped I/O operation.

7. The method according to claim 1, wherein the safety check operation instructions pertains to operations relating to one or more of:
a pointer bound;
a pointer allocation;
a pointer de-allocation;
a memory location;
a buffer size; and
a buffer location in memory.

8. The method according to claim 1, further comprising, prior to executing the computer program,
inserting the safety check operation instructions in the program.

9. The method according to claim 8, wherein the inserted safety check operation instructions comprise contextual information and inputs for executing corresponding safety check operations.

10. A computerized system, comprising:
a memory, storing a computer program and an operating system configured to manage resources for said program to execute, wherein the computer program is instrumented with safety check operations, so as to form a sequence of ordered instructions that comprise safety check operation instructions, in addition to generic execution instructions of the program and system inputs for the program to interact with the operating system, in operation;
one or more processors configured to execute each of the operating system and said computer program; and
a reference monitor, the latter configured to, while the computer program executes:
identify in the sequence a first instruction, as one of said safety check operation instructions, and deferring execution of the first instruction for subsequent execution thereof by enqueuing the first instruction in a queue comprising at least one previously enqueued safety check operation instruction;
after having identified the first instruction, identify in the sequence a second instruction as one of said generic computer program instructions and instruct to start execution thereof, irrespective of a completion status of the first instruction; and
after having identified the second instruction, identify in the sequence a third instruction as one of said system inputs for the executing computer program to interact with an operating system and instruct to require completion of execution of the first instruction prior to allow an execution of the third instruction to complete,
wherein the reference monitor is implemented as a computer program stored on the memory and executable by the one or more processors, the reference monitor configured to run in one of:
a kernel mode; and
a user mode.

11. The computerized system according to claim 10, wherein
the reference monitor is implemented as a hardware component configured to interact with the one or more processors.

12. The computerized system according to claim 10, wherein said queue is provisioned in the memory, so as to allow the first instruction to be enqueued therein, while executing the computer program and upon identifying the first instruction, whereby execution of the first instruction is deferred, in operation.

13. A computer program product for performing safety check operations while executing a computer program instrumented with safety check operations, so as for the instrumented computer program to form a sequence of ordered instructions that comprise safety check operation instructions, in addition to generic execution instructions of the program and system inputs for the executing program to interact with an operating system managing resources for said program to execute, the computer program product comprising a computer readable storage medium having program instructions embodied therewith, the program instructions being executable by one or more processors, to cause, while the computer program executes, to:

identify in the sequence a first instruction, as one of said safety check operation instructions, and deferring execution of the first instruction for subsequent execution thereof by enqueuing the first instruction in a queue;

after having identified the first instruction, identify in the sequence a second instruction as one of said generic computer program instructions and instruct to start execution thereof, irrespective of a completion status of the first instruction; and     after having identified the second instruction, identify in the sequence a third instruction as one of said system inputs for the executing computer program to interact with an operating system and instruct to require completion of execution of the first instruction prior to allow an execution of the third instruction to complete, and further     execute part or all of safety check operation instructions enqueued, and     force execution of said part or all of safety check operation instructions enqueued in the queue upon detecting that said queue is full.

\* \* \* \* \*